United States Patent
Nakajima et al.

(10) Patent No.: US 9,048,687 B2
(45) Date of Patent: Jun. 2, 2015

(54) POWER SUPPLY DEVICE AND CONTROL METHOD FOR POWER SUPPLY

(71) Applicants: Mikio Nakajima, Kanagawa (JP); Tetsuya Yano, Kanagawa (JP); Hideo Nakagawa, Kanagawa (JP); Yu Yoshioka, Kanagawa (JP)

(72) Inventors: Mikio Nakajima, Kanagawa (JP); Tetsuya Yano, Kanagawa (JP); Hideo Nakagawa, Kanagawa (JP); Yu Yoshioka, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 198 days.

(21) Appl. No.: 13/652,688

(22) Filed: Oct. 16, 2012

(65) Prior Publication Data

US 2013/0099573 A1    Apr. 25, 2013

(30) Foreign Application Priority Data

Oct. 19, 2011  (JP) .................................. 2011-229678
Sep. 5, 2012   (JP) .................................. 2012-195189

(51) Int. Cl.
| H02J 9/00 | (2006.01) |
| H02J 1/10 | (2006.01) |
| H02J 1/14 | (2006.01) |
| H02J 7/34 | (2006.01) |

(52) U.S. Cl.
CPC . *H02J 1/108* (2013.01); *H02J 1/14* (2013.01); *H02J 7/345* (2013.01)

(58) Field of Classification Search
CPC ............. H02J 9/062; H02J 9/061; H02J 9/04; H01H 2300/018
USPC .......... 307/64, 44; 399/88; 320/150; 713/340
See application file for complete search history.

(56) References Cited

U.S. PATENT DOCUMENTS

| 2001/0004425 A1 | 6/2001 | Shinohara et al. |
| 2007/0071479 A1 | 3/2007 | Semma et al. |
| 2007/0098433 A1 | 5/2007 | Yano et al. |
| 2007/0200432 A1* | 8/2007 | Yano et al. ...................... 307/44 |
| 2007/0201049 A1 | 8/2007 | Semma et al. |
| 2007/0201894 A1 | 8/2007 | Kishi et al. |
| 2007/0212102 A1* | 9/2007 | Yano ............................... 399/88 |
| 2008/0155294 A1* | 6/2008 | Kikuchi et al. ............... 713/340 |
| 2008/0197813 A1* | 8/2008 | Asakura et al. ............... 320/150 |

FOREIGN PATENT DOCUMENTS

| JP | 2004-236492 | 8/2004 |
| JP | 2005-148581 | 6/2005 |
| JP | 2005148581 | * 6/2005 |
| JP | 2007-236159 | 9/2007 |

* cited by examiner

*Primary Examiner* — Rexford Barnie
*Assistant Examiner* — Toan Vu
(74) *Attorney, Agent, or Firm* — Oblon, McClelland, Maier & Neustadt, L.L.P.

(57) ABSTRACT

A power supply device includes: a main power supply configured to feed power to a load with constant-voltage output using an external power supply; an auxiliary power supply configured to feed power to the load using an internal power storage unit; a constant-current/constant-voltage switching power supply configured to feed a part of current flowing through the load by which part the current exceeds an upper limit value of output current of the main power supply instructed by a current upper-limit instruction unit, with the constant-current output from the auxiliary power supply; and an output switching unit switching the constant-current/constant-voltage switching power supply from the constant-current output to the constant-voltage output when a power cut monitoring unit determines stop of power supply from the external power supply.

7 Claims, 9 Drawing Sheets

POWER SUPPLY DEVICE AND CONTROL METHOD FOR POWER SUPPLY

CROSS-REFERENCE TO RELATED APPLICATIONS

The present application claims priority to and incorporates by reference the entire contents of Japanese Patent Application No. 2011-229678 filed in Japan on Oct. 19, 2011 and Japanese Patent Application No. 2012-195189 filed in Japan on Sep. 5, 2012.

BACKGROUND OF THE INVENTION

1. Field of the Invention

The present invention relates to a main power supply using electric power supplied from an external power supply, a power supply device including an auxiliary power supply using electric power of an internal storage unit, and a control method for the power supply device.

2. Description of the Related Art

A copier, a printer, and a facsimile that utilize an electronic photographing process, and an image formation device such as a multifunction printer in which these are combined have come to be multi-functionalized recently, and the structures thereof have therefore become complicated. As a result, the maximum consumption power has been increasing.

The electric power supplied to a fixing heater has been increasing for reducing the user standby time or because of the factors of the image formation device itself such as the standby time till the startup of a fixing device or a suspension of an operation of printing or copying due to decrease in fixing temperature.

Meanwhile, there is an upper limit on the electric power that a commercial power supply as an external power supply can provide; therefore, when only a main power supply for supplying electric power from a commercial power supply is used, the supply power exceeds the range of the maximum consumption power. As a result, in an image formation device, an auxiliary power supply using an internal power storage unit is utilized and the electric power is supplied to a system of the image formation device by switching these two power supplies (for example, see Japanese Patent Application Laid-open No. 2004-236492).

In the invention described in Japanese Patent Application Laid-open No. 2004-236492, an electric power output circuit of a power storage unit, i.e., a power feeding circuit for a load is formed using a constant-voltage power supply; therefore, in the case where the output of an AC/DC power supply (main power supply) as a constant-voltage power supply and the output of an auxiliary power supply as a constant-voltage power supply similarly are fed to the load while they are switched, the voltage fluctuation occurs at the switching time due to the difference in output voltage between the two constant-voltage power supplies.

The occurrence of voltage fluctuation causes the operation of a motor that receives the electric power to be unstable, resulting in the problem of stop of the motor or uneven rotation of the motor. The uneven rotation of the motor leads to abnormality in image of an image formation device. For example, in the case of a color image formation device, color shift occurs.

As a power supply device for this problem, a power supply device is provided which includes: a main power supply for feeding electric power, which is supplied from an external power supply, to a load with the constant-voltage output; a load current detection unit for detecting a value of current flowing through the load; a control signal generation unit for generating a control signal based on the value of the current flowing through the load and an upper-limit instruction value for an output current value of the main power supply, the control signal making up for the current that exceeds the upper-limit instruction value; and an auxiliary power supply for feeding electric power of an internal power storage unit to the load with the constant-current output in accordance with the control signal (for example, see Japanese Patent Application Laid-open No. 2007-236159).

The power supply device according to Japanese Patent Application Laid-open No. 2007-236159 can simultaneously supply both the electric power from the main power supply and the electric power from the auxiliary power supply to the load, thereby eliminating the power feeding switching from one to the other and eliminating the voltage fluctuation that is caused by the switching.

However, the power supply device according to Japanese Patent Application Laid-open No. 2007-236159 described above has had a problem in that the power feeding from the auxiliary power supply stops when the power feeding from the external power supply has stopped due to a power cut or the like because the control signal generation unit cannot generate the control signal.

There is a need to make it possible to supply power to the load even if power supply from the external power supply is stopped, in a power supply device including a main power supply that feeds power to the load with constant-voltage output using the external power supply as an electric power supply source, and an auxiliary power supply that feeds power to the load with constant-current output using an internal power storage unit as an electric power supply source, wherein a part of load current by which part the load current exceeds an upper-limit instruction value of an output current value of the main power supply is fed from the auxiliary power supply.

SUMMARY OF THE INVENTION

It is an object of the present invention to at least partially solve the problems in the conventional technology.

A power supply device includes: a main power supply configured to feed power to a load with constant-voltage output using an external power supply as an electric power supply source; an auxiliary power supply capable of switching between constant-current output and constant-voltage output, and configured to feed power to the load using an internal power storage unit as an electric power supply source; a load current detector configured to detect a value of current flowing through the load; a current upper-limit value instruction unit configured to output an upper-limit value of output current of the main power supply; a constant-current/constant-voltage switching power supply configured to feed, based on a value of current flowing through the load detected by the load current detector and an upper-limit value of output current of the main power supply given from the current upper-limit instruction unit, a part of the current flowing through the load by which part the current flowing through the load exceeds the upper limit value, with the constant-current output from the auxiliary power supply; a power cut detection unit configured to detect stop of supply of electric power from the external power supply; a power cut monitoring unit configured to monitor occurrence of a power cut in accordance with a power cut detection signal resulting from detection by the power cut detection unit; and an output switching unit switching the constant-current/constant-voltage switching power supply from the constant-current output to the constant-voltage output when the power cut monitoring unit determines stop of power supply from the external power supply.

A power supply device includes: a main power supply configured to feed power to a load with constant-voltage output using an external power supply as an electric power supply source; an auxiliary power supply capable of switching between constant-current output and constant-voltage output, and configured to feed power to the load using an internal power storage unit as an electric power supply source; a load current detector configured to detect a value of current flowing through the load; a current upper-limit value instruction unit configured to output an upper-limit value of output current of the main power supply; a constant-current/constant-voltage switching power supply configured to feed, based on a value of current flowing through the load detected by the load current detector and an upper-limit value of output current of the main power supply given from the current upper-limit instruction unit, a part of the current flowing through the load by which part the current flowing through the load exceeds the upper-limit value, with the constant-current output from the auxiliary power supply; a power cut detection unit configured to detect stop of supply of electric power from the external power supply; and a switching circuit configured to switch output of the constant-current/constant-voltage switching power supply to the constant-voltage output in accordance with a power cut detection signal resulting from detection by the power cut detection unit.

A control method is for a power supply device. The power supply device includes: a main power supply configured to feed power to a load with constant-voltage output using an external power supply as an electric power supply source; an auxiliary power supply capable of switching between constant-current output and constant-voltage output, and configured to feed power to the load using an internal power storage unit as an electric power supply source; a load current detector configured to detect a value of current flowing through the load; a current upper-limit value instruction unit configured to output an upper-limit value of the output current of the main power supply; a constant-current/constant-voltage switching power supply configured to feed, based on a value of current flowing through the load detected by the load current detector and an upper-limit value of output current of the main power supply given from the current upper-limit instruction unit, a part of the current flowing through the load by which part the current flowing through the load exceeds the upper-limit value, with the constant-current output from the auxiliary power supply; and a power cut detection unit configured to detect stop of supply of electric power from the external power supply. The method includes: a power cut monitoring step of monitoring occurrence of a power cut in accordance with a power cut detection signal resulting from detection by the power cut detection unit; and an output switching step of switching the constant-current/constant-voltage switching power supply from the constant-current output into the constant-voltage output when the power cut detection unit determines the stop of power supply from the external power supply in the power cut monitoring step.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of a power supply device, a control method for the power supply device, and a program according to the present invention are specifically described with reference to attached drawings.

First Embodiment

Structure and Use Environment of Image Formation Device

Figure 1:
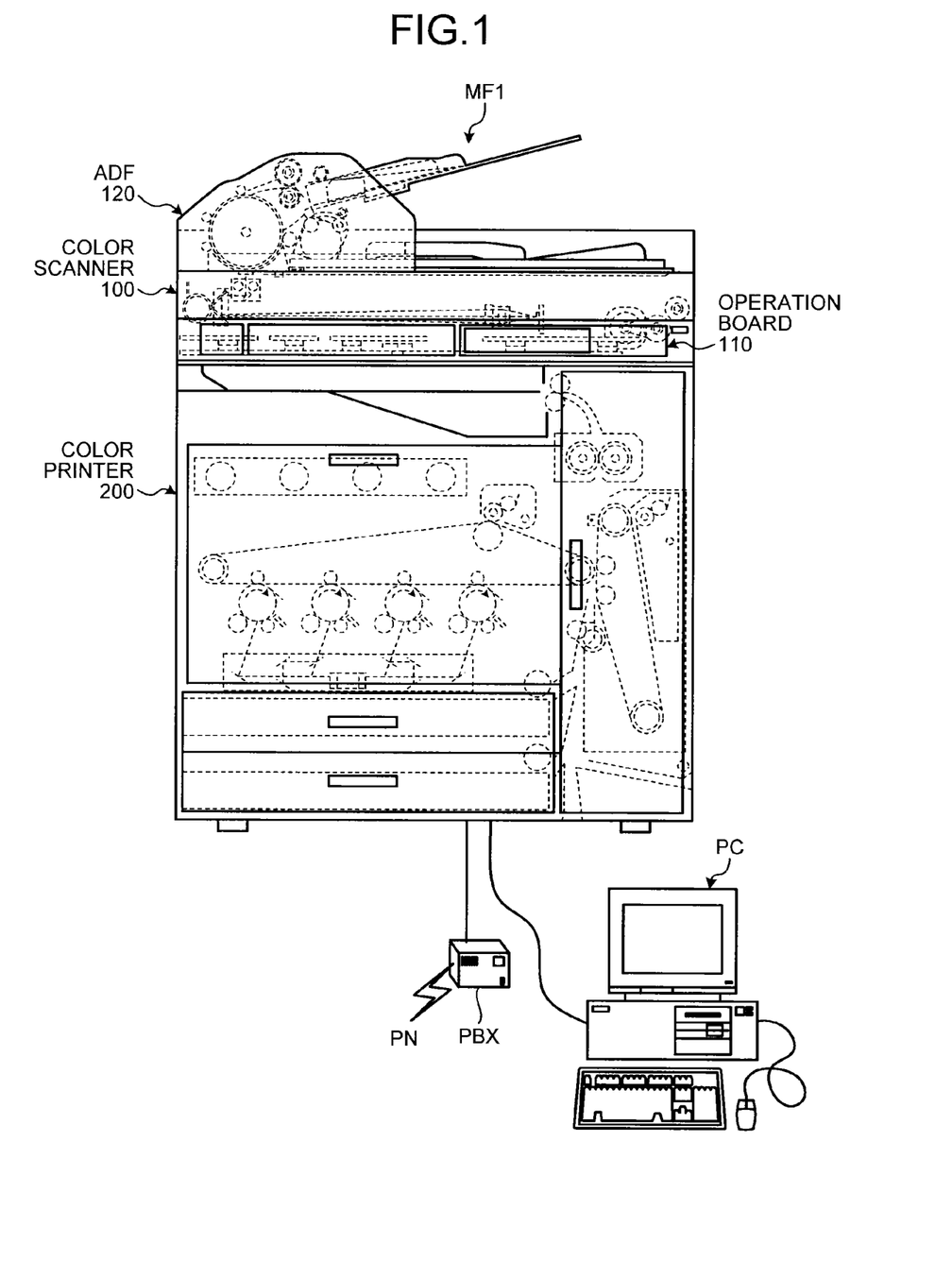
FIG. 1 is an explanatory view illustrating a structure of a full-color digital multi-functional copier as an image formation device according to an embodiment, and its usage environment.

FIG. 1 is an explanatory view illustrating a structure of a full-color digital multi-functional copier as an image formation device according to an embodiment of the present invention, and its use environment.

This full-color digital multi-functional copier MF1 includes units of an auto document feeder (ADF) 120, an operation board 110, a color scanner 100, and a color printer 200. The operation board 110 and the color scanner 100 equipped with the ADF 120 are the units that can be detached from the color printer 200. The color scanner 100 has a control board having a power device driver, a sensor input, and a controller, and reads a document image while the timing is controlled through direct or indirect communication with an engine controller. A control unit 220 executes the entire control over the color printer 200.

The full-color digital multi-functional copier MF1 is connected to a PC (personal computer), and can print a color image based on print data transmitted from the PC. Furthermore, this full-color digital multi-functional copier MF1 is connected a PN (public network) via a PBX (private branch exchange), and can print an image based on facsimile data or the like received from the PN.

Mechanism of Color Printer 200

Figure 2:
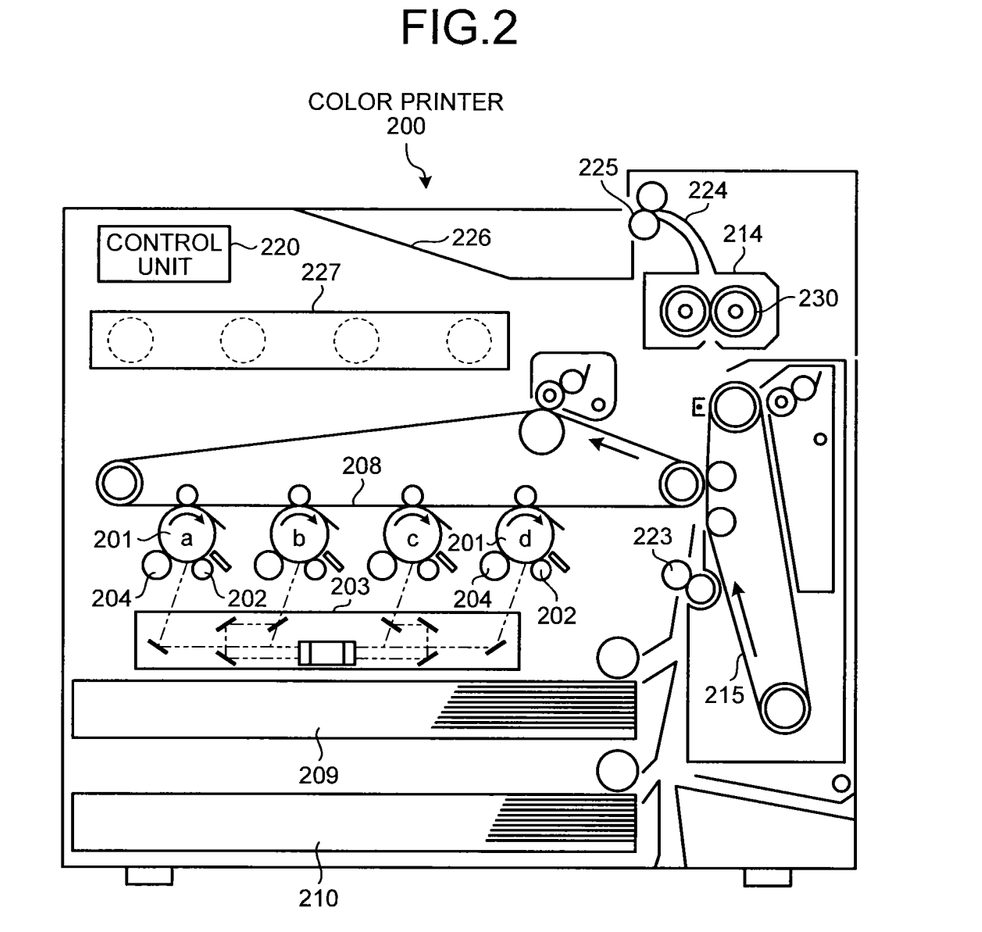
FIG. 2 is an explanatory view illustrating a mechanism of the color printer of FIG. 1.

FIG. 2 is an explanatory view illustrating the mechanism of the color printer 200 of FIG. 1. The color printer 200 is a laser printer. In the color printer 200, four sets of imaging units a to d for forming images of magenta (M), cyan (C), yellow (Y), and black (K) colors are arranged in this order in a direction in which a first transcription belt 208 moves (from left to right in the drawing). In other words, the color printer 200 is a full-color image formation device of four-drum type (tandem type).

On an outer periphery of each photoreceptor 201 rotatably supported and rotating in an arrow direction, a charge neutralizing device, a cleaning device, a charging device 202, and a developing device 204 are provided. Between the charging device 202 and the developing device 204, a space into which optical information generated from an exposure device 203 is input is secured. The number of photoreceptors 201 is four (a, b, c, and d), and the component structures each for forming an image provided for the periphery are the same except that the color material (toner) handled by the developing device 204 is different.

A part of each photoreceptors 201 (four pieces) is in contact with the first transcription belt 208. The photoreceptor may have a belt-like shape. The first transcription belt 208 is supported and stretched between a support roller and a driving roller which are rotatable so that the first transcription belt 208 can move in an arrow direction, and on the rear side (inside a loop), a first transcription roller is provided in the vicinity of the photoreceptor 201. Outside the belt loop is provided the cleaning device for the first transcription belt. After the first transcription belt 208 transcribes a toner image onto transcription paper (sheet) or a second transcription belt, the unnecessary toner remaining on the surface is removed.

The exposure device 203 irradiates surfaces of the uniformly charged photoreceptors with optical information corresponding to the full-color image formation as a latent image by a known laser method. An exposure device including an LED array and an imaging unit can alternatively be employed.

A second transcription belt 215 is provided on the right side of the first transcription belt 208. The first transcription belt 208 and the second transcription belt 215 are in contact with each other and form a predetermined transcription nip. The second transcription belt 215 is supported and stretched between the support roller and the driving roller so that the second transcription belt 215 can move in the arrow direction, and on the rear side (inside the loop), a second transcription unit is provided.

Outside the belt loop the cleaning device, a charger, and the like for the second transcription belt are provided. After the toner is transcribed to the sheet, this cleaning device removes the unnecessary remaining toner.

The pieces of transcription paper (sheets) are housed in paper feeding cassettes 209 and 210 in the lower part of the drawing. The uppermost piece of paper is conveyed one by one to a resist roller 223 via a plurality of sheet guides. Above the second transcription belt 215, a fixing unit 214, a paper discharge guide 224, a paper discharge roller 225, and a paper discharge stack 226 are provided.

Above the first transcription belt 208 and below the paper discharge stack 226 is provided a housing unit 227 for housing supplemental toners. The toner colors are magenta, cyan, yellow, and black, and the toners are housed in a cartridge form. The toners are supplied to the developing device 204 of the corresponding color through a powder pump or the like as appropriate.

Here, the operation of each unit at the double-sided printing is described. First, imaging by the photoreceptors 201 is performed. In other words, the light from an LD light source, which is not illustrated, is delivered by the operation of the exposure device 203 through an optical component, which is not illustrated, onto the photoreceptor of an imaging unit a among the photoreceptors 201 uniformly charged by the charging device 202, and thus a latent image corresponding to the written information (information corresponding to the color) is formed. The latent image on the photoreceptor 201 is developed by the developing device 204 and the visual image by the toner is formed and held on the surface of the photoreceptor 201. This toner image is transcribed onto a surface of the first transcription belt 208 moving in synchronization with the photoreceptor 201 by a first transcription unit. The toner remaining on the surface of the photoreceptor 201 is cleaned by the cleaning device, and the surface of the photoreceptor 201 neutralized by the charge neutralizing device prepares for the next imaging cycle.

The first transcription belt 208 supports the toner image transcribed onto the surface, and moves in the arrow direction. A latent image corresponding to another color is written in the photoreceptor 201 of an imaging unit b, and the visual image is formed by development with the toner of the corresponding color. This image is overlapped on the visual image of the previous color that has already been put on the first transcription belt 208, and finally the images of the four colors are overlapped. In some cases, the image of a single color (only black) is formed.

At this time, the second transcription belt 215 is moved in the arrow direction in synchronization with the first transcription belt 208, and by the operation of the second transcription unit, the image formed on the surface of the first transcription belt 208 is transcribed to a surface of the second transcription belt 215. While the image is formed on each of the photoreceptors 201 of the four imaging units a to d of a so-called tandem type, the first transcription belt 208 and the second transcription belt 215 are moved to proceed imaging, whereby the time can be shortened.

Once the first transcription belt 208 reaches a predetermined position, the toner image which should be formed on another surface of the sheet is formed by the photoreceptor 201 again in the aforementioned process, and the paper feeding is started. That is, the uppermost sheet in the paper feeding cassette 209 or 210 is extracted and conveyed to the resist roller 223. Then, the toner image on the surface of the first transcription belt 208 is transcribed by the second transcription unit to a surface on one side of the sheet sent between the first transcription belt 208 and the second transcription belt 215 via the resist roller 223.

Moreover, the sheet is conveyed upward and the toner image on the surface of the second transcription belt 215 is transcribed to another surface of the sheet by a charger. At the transcription, the conveyance is performed in accordance with the timing so that the position of the image on the sheet is normal.

The sheet both surfaces of which have the toner image transcribed in the above step is sent to the fixing unit 214 incorporating fixing rollers 230, and the toner images (both sides) on the sheet are melted and fixed at the same time. Then, the sheet is discharged to the paper discharge stack 226 in the upper part of the main body frame by the paper discharge roller 225 via the paper discharge guide 224.

In the case of structuring the paper discharge units 224 to 226 as illustrated in FIG. 2, the surface (page) of the sheet to which the image is transcribed later in the double-sided images, that is, the surface of the sheet to which the image is directly transcribed from the first transcription belt 208 serves as the lower surface and placed in the paper discharge stack 226; therefore, the image for the second page is formed first for aligning the pages and the toner image is held on the second transcription belt 215 and the image for the first page is directly transcribed from the first transcription belt 208 to the sheet. Exposure is performed so that the image transcribed directly from the first transcription belt 208 to the sheet is a front image on the surface of the photoreceptor and the toner image transcribed from the second transcription belt 215 to the sheet is an inversion image (mirror image) on the surface of the photoreceptor. The order of imaging for aligning the pages and the image processing for switching between the front image and the inversion image (mirror image) are performed by the reading and writing control of the image data with respect to the memory on the controller.

After the transcription is performed from the second transcription belt 215 to the sheet, the cleaning device including a brush roller, a collection roller, a blade, or the like removes the unnecessary toner or paper dust remaining on the second transcription belt 215.

The above is the description on the imaging process in the double-sided printing mode in which "double-sided transcription mode" is set. In the case of the double-sided printing, the printing is normally performed through this imaging process.

In the case of single-sided printing, there are two modes: "a single-sided transcription mode using the second transcription belt 215"; and "a single-sided transcription mode using the first transcription belt 208". In the case of setting the former single-sided transcription mode using the second transcription belt 215, the visual image formed using three colors, four colors, or a single black color on the first transcription belt 208 is transcribed to the second transcription belt 215 and transcribed to a single side of the sheet. The image is not transcribed to another surface of the sheet. In this case, the printed plane comes on the top surface of the printed sheet discharged to the paper discharge stack 226.

In the case of setting the latter single-sided transcription mode using the first transcription belt 208, the visual image formed using three colors, four colors, or a single black color on the first transcription belt 208 is not transcribed to the second transcription belt 215 but transcribed to a single side of the sheet. The image is not transcribed to another surface of the sheet. In this case, the printed plane comes on the lower surface of the printed sheet discharged to the paper discharge stack 226.

Structure of Power Supply Device According to the First Embodiment

Figure 3:
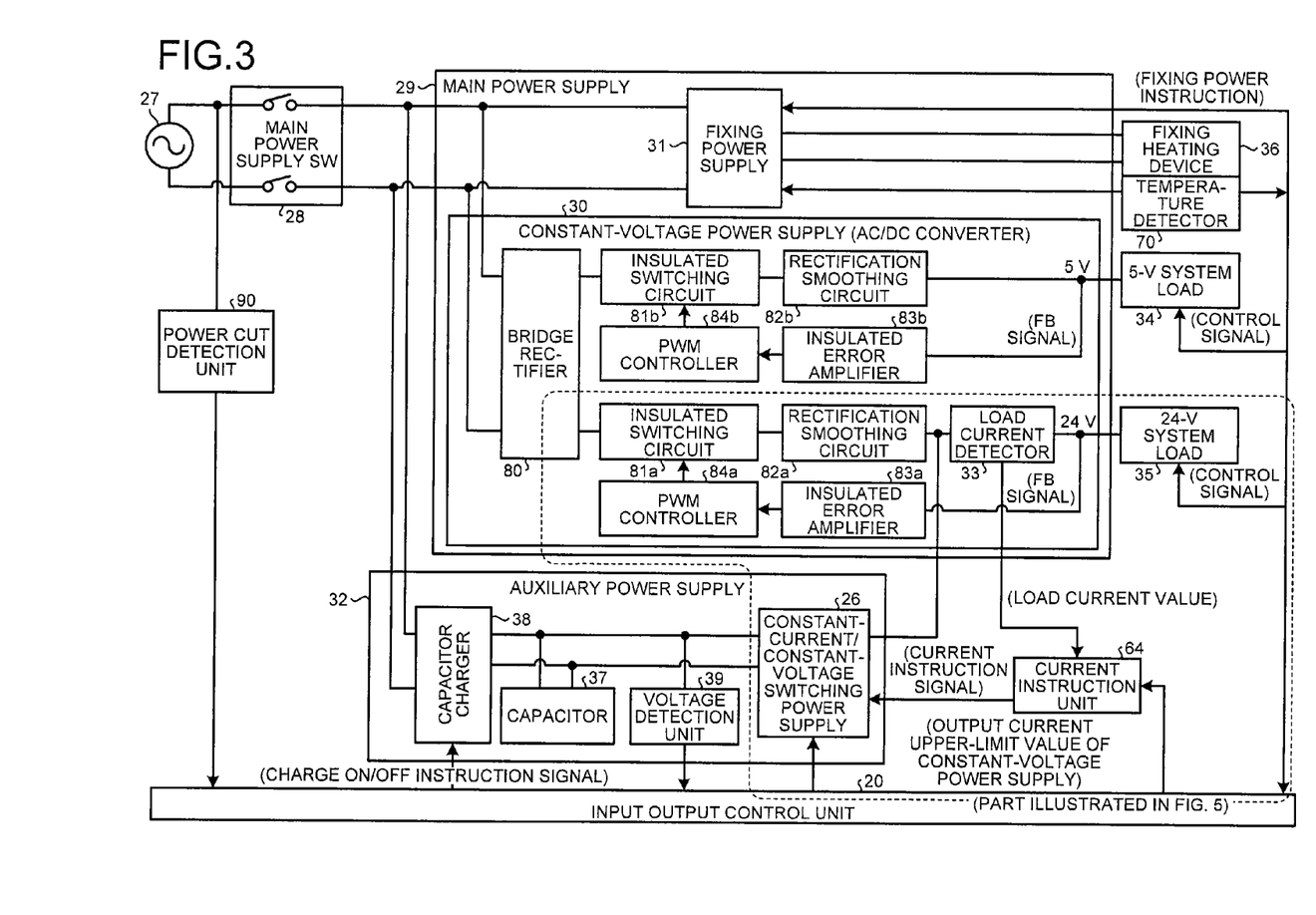
FIG. 3 is a block diagram illustrating a structure of a power supply device according to a first embodiment.

FIG. 3 is a block diagram illustrating the structure of the power supply device according to the first embodiment of the present invention. This power supply device is provided for the full-color digital multi-functional copier MF1 illustrated in FIG. 1.

By turning on a main power supply SW (switch) 28, a commercial AC power supply 27 supplies power to a main power supply 29 and an auxiliary power supply 32. From the commercial AC power supply 27, the commercial AC voltage is applied to a fixing power supply 31, that is an AC control circuit, and a constant-voltage power supply 30 of the main power supply 29, and a capacitor charger 38 of the auxiliary power supply 32. The fixing power supply 31 performs feedback control of temperature of a fixing heating device 36 using a detection signal representing fixture temperature given from a temperature detector 70 within an electric power range specified by an electric power instruction signal (an upper-limit value of output current) given from an input output control unit 20.

The constant-voltage power supply 30 as a first power supply of the main power supply 29 converts the commercial AC (alternating current) into DC (direct current) through a bridge rectifier 80, an insulated switching circuit 81, and a rectification smoothing circuit 82, generates two DC constant voltages of 5 V and 24 V through constant-voltage feedback control using a voltage detection signal given to a PWM controller 84 via an insulated error amplifier 83, and outputs the DC constant voltages to a 5-V system load 34 and a 24-V system load 35. At this time, a 24-V system voltage detection signal (feedback (FB) signal) is given to an insulated error amplifier 83a from a part after a load current detector 33.

Although more detailed explanation is made later, the load current detector 33 includes a current detection resistor 60 (see FIG. 5) with several milliohms inserted in series in a power supply line. Therefore, if the current detection resistor 60 serving as a current sensor for the load current detector 33 is provided after a voltage detection signal (feedback signal) intake part, voltage applied to the load fluctuates due to increase and decrease of voltage drop of the current detection resistor 60 that are caused by increase and decrease of a load current value.

Figure 5:
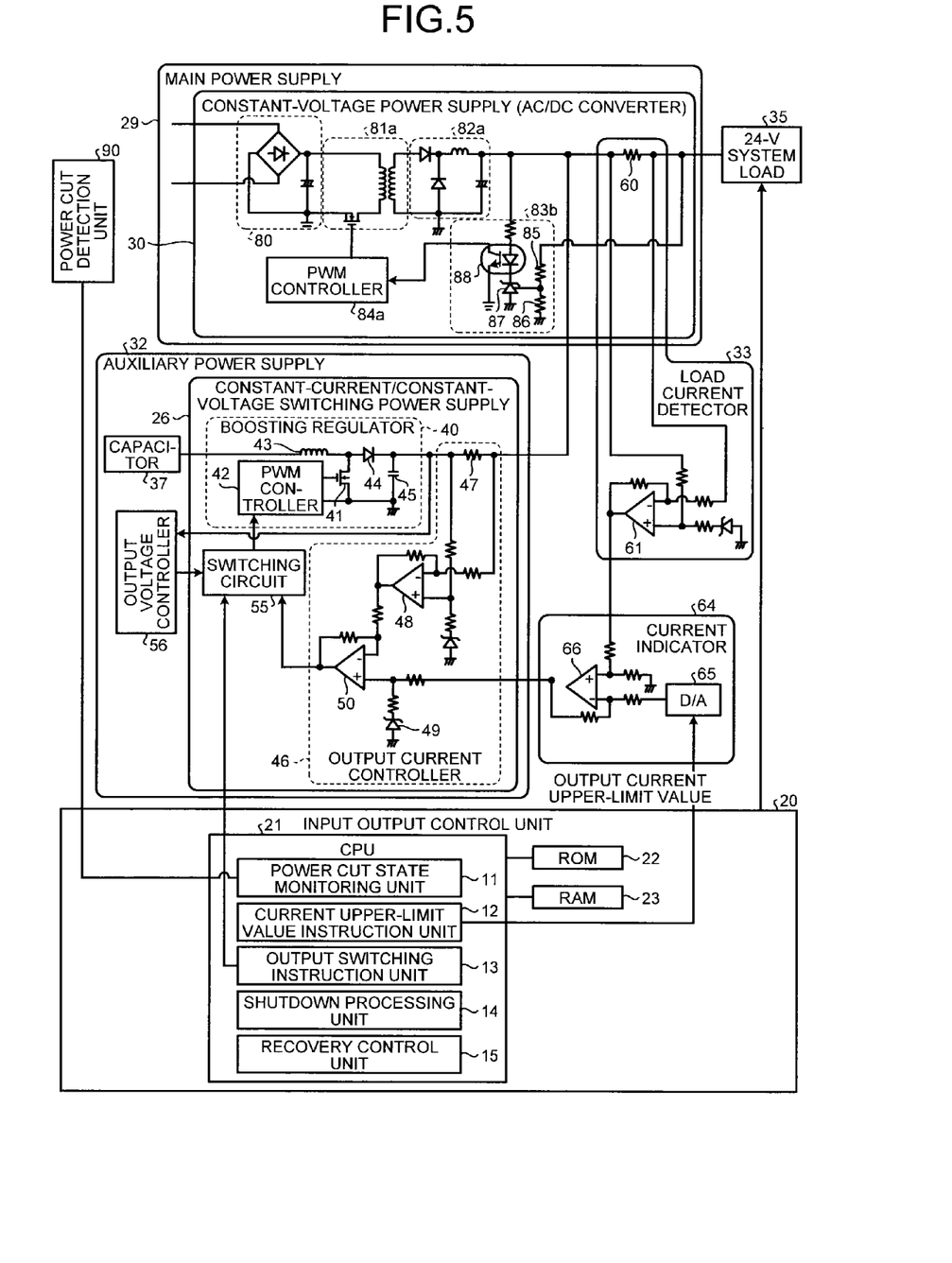
FIG. 5 is an explanatory view illustrating detailed structures of a constant-voltage power supply, a constant-current/constant-voltage switching power supply, a load current detector, and a current instruction unit in FIG. 3.

For example, in a case where a resistor with a resistance of 10 mΩ is connected as the current detection resistor 60 of the load current detector 33 and a load changes from 5 A to 15 A, a fluctuation of 0.1 V (10 mΩ×(15 A−5 A)) occurs. Moreover, in a case where the current detection resistor 60 of the load current detector 33 is added outside the main power supply 29, voltage applied to the load fluctuates more due to influence of wire resistance. In order to prevent fluctuation of the DC load application voltage due to addition of the current detection resistor 60, a configuration in which voltage after the current detection resistor 60 is fed back to the constant-voltage power supply 30 to perform constant-voltage control, i.e., feedback control so that feedback voltage coincides with a target value.

The auxiliary power supply 32 includes, in this embodiment, the capacitor charger 38, a capacitor 37 charged thereby, and a constant-current/constant-voltage switching power supply 26 as a second power supply that outputs electric power of the capacitor 37 with constant current to a power feeding line toward the 24-V system load 35.

Power is fed to the 24-V system load 35 using the auxiliary power supply 32 in order to compensate for an increase of supply power to the fixing heating device 36 by decreasing electric power fed from the first power supply (constant-voltage power supply 30), consuming AC power, to the 24-V system load 35, and compensating for this decrease by feeding power from the auxiliary power supply 32 to the 24-V system load 35.

For this reason, in this embodiment, a configuration is employed in which power is fed from the auxiliary power supply 32 to the 24-V system load 35 (for example, 500 W), consuming more power than the 5-V system load 34 (for example, 100 W), in consideration of an increase (for example, 300 W) of supply power to the fixing heating device 36. However, in a case where an increase of supply power to the fixing heating device 36 is small or consumption power of the 5-V system load 34 is large, a configuration is possible in which power is fed from the auxiliary power supply 32 to the 5-V system load 34.

The load current detector 33 detects a current value of the 24-V system load, which corresponds to the sum of values of current simultaneously supplied from the constant-voltage power supply 30 (first power supply) and the constant-current/constant-voltage switching power supply 26 (second power supply), and gives an obtained current detection signal to a current instruction unit 64. The current instruction unit 64 receives current upper-limit value instruction data specifying an output current upper-limit value of the constant-voltage power supply 30 from the input output control unit 20. The current instruction unit 64 gives a current instruction signal (control signal) representing a value obtained by subtracting the upper-limit instruction value from a value of load current flowing through the 24-V system load 35 (=the output current instruction value of the constant-current/constant-voltage switching power supply 26) to the constant-current/constant-voltage switching power supply 26.

The constant-current/constant-voltage switching power supply 26 feeds electric power of the capacitor 37 to the 24-V system load line with constant current in accordance with constant-current control in which a target value is a current value instructed by the current instruction signal from the current instruction unit 64. A power cut detection unit 90 detects a power cut of the commercial AC power supply line. When this power cut detection unit 90 detects a power cut, the power cut detection unit 90 gives that information to the input output control unit 20. At this time, the input output control unit 20 performs control to switch the output of the constant-current/constant-voltage switching power supply 26 into constant-voltage output.

The capacitor 37 of the auxiliary power supply 32 includes a large-capacitance capacitor such as an electric double-layer capacitor. There are various alternatives to the electric double-layer capacitor; however, in this embodiment, the electric double-layer capacitor capable of being charged and discharged in a short time and having a long life is employed. The electric double-layer capacitor has a characteristic that terminal voltage (capacitor voltage) decreases as discharge progresses. Therefore, the constant-current/constant-voltage switching power supply 26 is disposed after the capacitor 37 so that a predetermined current value is output regardless of fluctuation of the capacitor voltage.

Structure of Input Output Control Unit 20

Figure 4:
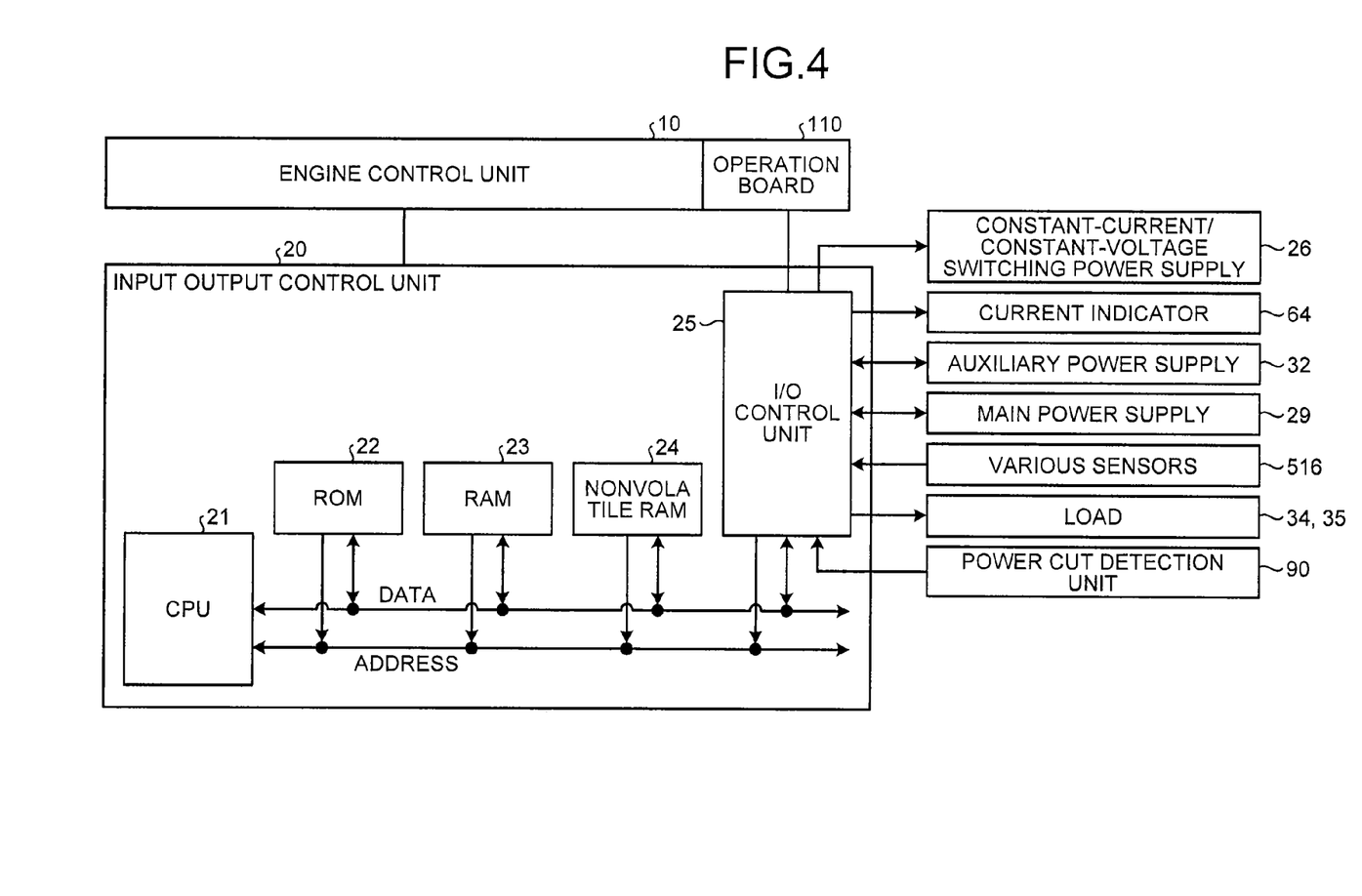
FIG. 4 is a block diagram illustrating a structure of an input output control unit of FIG. 3.

FIG. 4 is a block diagram of a structure of the input output control unit 20 in FIG. 3. The input output control unit 20 includes: a CPU 21 that performs input and output control of the respective loads and control of the power supply device in accordance with a control order from an engine control unit 10, a program stored in a ROM 22, and a program or data stored in a nonvolatile RAM 24; the ROM 22 that stores the program to cause the CPU 21 to operate; a RAM 23 used as a work memory for the CPU 21; the nonvolatile RAM 24 that stores a consumption power table storing an operation state of the respective loads and consumption power data in respective operation modes, and a print processing time table storing time data required for print processing in the respective operation modes; and an I/O control unit 25 that controls reading of input from various sensors 516 of the full-color digital multi-functional copier MF1 (FIG. 1) and driving of each of the loads 34 and 35.

The input output control unit 20 performs input and output control of the sensors and the loads and control of the power supply device in accordance with instructions accompanying sequence control and process control of image reading, printing, copying, and the like of the engine control unit 10, and causes the respective loads to operate sequentially in accordance with the respective operation modes. The input output control unit 20 also controls charge and discharge of the capacitor 37 in accordance with a charge on/off instruction signal, and feeds electric power stored in the capacitor 37 to the 24-V system load 35 at the time of startup of the device and in a predetermined period after the startup. At this time, an amount of electric power supplied to the fixing heating device 36 is increased by a surplus power of the commercial AC power supply 27 relative to supply power.

The input output control unit 20 sends a switching instruction from constant-current control to constant-voltage control to the constant-current/constant-voltage switching power supply 26 when it is determined that a power cut occurs based on a signal from the power cut detection unit 90.

Details of constant-voltage power supply, constant-current/constant-voltage switching power supply, load current detector, and current instruction unit FIG. 5 is an explanatory view illustrating the detailed structures of the input output control unit 20, the constant-voltage power supply 30, the constant-current/constant-voltage switching power supply 26, the load current detector 33, and the current instruction unit 64.

The input output control unit 20 includes the CPU 21, the ROM 22, and the RAM 23 as also illustrated in FIG. 4. The CPU 21 has functions of a power cut state monitoring unit 11, a current upper-limit value instruction unit 12, an output switching instruction unit 13, a shutdown processing unit 14, and a recovery control unit 15.

The power cut state monitoring unit 11 monitors occurrence of a power cut in accordance with a signal that notifies presence or absence of a power cut sent from the power cut detection unit 90. The current upper-limit value instruction unit 12 sends upper-limit instruction data, specifying an upper-limit value of output current of the constant-voltage power supply 30, to the current instruction unit 64. The output switching instruction unit 13 performs control to switch the constant-current/constant-voltage switching power supply 26 into constant-voltage output when the power cut state monitoring unit 11 detects a power cut. The shutdown processing unit 14 executes shutdown processing including processing of preparing for a next startup and protection processing for various data. The recovery control unit 15 performs charge operation in preparation for next occurrence of a power cut after recovery from a power cut.

The constant-voltage power supply 30 of the main power supply 29 performs comparison of a voltage detection signal, obtained by dividing voltage after (on the 24-V system load 35 side of) the current detection resistor 60 included in the load current detector 33 by voltage dividing resistors 85 and 86, and a reference voltage and amplification through a shunt regulator 87, and then gives a feedback signal for constant-voltage control to a PWM controller 84a while ensuring insulation through a photocoupler 88. Thus, voltage just before being supplied to the 24-V system load 35, i.e., voltage of a power supply line between the current detection resistor 60 and the 24-V system load 35, i.e., load application voltage is subjected to constant-voltage control.

The electric double-layer capacitor as the capacitor 37 of the auxiliary power supply 32 has low withstanding voltage and charge upper-limit voltage in usage is 2.5 V. For this reason, multiple capacitors need to be connected in series in order to provide high voltage. However, as compared with structure in which many small-capacitance capacitors are connected in series, use of fewer large-capacitance capacitors can achieve the same capacitance at lower cost.

In a case where nine or less electric double-layer capacitors connected in series are used to feed power to the 24-V system load 35, charge upper-limit voltage is 22.5 V or less; therefore, the constant-current/constant-voltage switching power supply 26 needs to be structured using a boosting regulator.

In view of this, in this embodiment, output of the capacitor 37 is boosted using a boosting regulator 40 of the constant-current/constant-voltage switching power supply 26 to perform constant-current output. A semiconductor switch 41 of the boosting regulator 40 is switched to conduction (on) during an H (high) period of a PWM (Pulse Width Modulation) pulse output from a PWM controller 42 and is switched to non-conduction (off) during an L (low) period thereof. While the switch 41 is switched to conduction, current flows from the capacitor 37 to a reactor 43 and the switch 41 and power is stored in the reactor 43. When the switch 41 is switched to non-conduction, power stored in the reactor 43 comes to have high voltage and performs high-voltage charging on a capacitor 45 through a diode 44. By repeating turning on/off of the switch 41 in a PWM pulse cycle, voltage of the capacitor 45 is boosted and power is fed to the 24-V system load 35 through a current detection resistor 47 and through the current detection resistor 60 of the load current detector 33.

The load current detector 33 amplifies potential difference between both ends of the current detection resistor 60 with a differential amplifier 61, generates a load current signal (analog voltage) that is proportional to a load current value, and outputs (applies) the signal to the current instruction unit 64.

The current instruction unit 64 performs analog conversion on current upper-limit value instruction data given by the current upper-limit value instruction unit 12 of the input output control unit 20 into an upper-limit instruction signal (voltage) in a D/A converter 65. Then, calculation of "load current detection value−upper-limit instruction value" is performed in a differential amplifier 66, and differential voltage representing result of the calculation is output to the constant-current/constant-voltage switching power supply 26 as a current instruction signal.

That is to say, the current instruction unit 64 instructs the constant-current/constant-voltage switching power supply 26 to output current corresponding to a differential value obtained by subtracting an output current upper-limit value of the constant-voltage power supply 30 instructed by the current upper-limit value instruction unit 12 of the input output control unit 20 from current value detected by the load current detector 33 as a target value which should be supplied from the constant-current/constant-voltage switching power supply 26.

The constant-current/constant-voltage switching power supply 26 amplifies potential difference between both ends of the current detection resistor 47 of an output current controller 46 in a differential amplifier 48, generates an output current signal that is proportional to an output current value, and gives the signal to a differential amplifier 50. The differential amplifier 50 amplifies difference of the target current value given by the current instruction unit 64 from the output current signal, and further adds voltage given by a bias circuit 49, and gives this result to the PWM controller 42 as a duty instruction signal of a PWM pulse.

The PWM controller 42 sets duty of a PWM pulse, according to which the semiconductor switch 41 is driven on/off, to the duty specified by the duty instruction signal. In other words, duty of a PWM pulse is increased when output voltage of the differential amplifier 50 is increased and output signal of the current instruction unit 64 is increased. Thus, output current value of the boosting regulator 40 is increase.

When a voltage drop of the current detection resistor 47 is increased accordingly to increase a level of an output current detection signal and decrease an output voltage of the differential amplifier 50, duty of a PWM pulse is decreased. This decreases an output current value of the boosting regulator 40.

With such feedback PWM control, an output current value of the boosting regulator 40 corresponds to difference, given from the current instruction unit 64, between a load current detection value of the 24-V system load 35 and an output current upper-limit value of the constant-voltage power supply 30 instructed by the input output control unit 20.

Next, details of mount structure of the load current detector 33 are explained. The current detection resistor 60 of the load current detector 33 is mounted as a part of the constant-voltage power supply 30 of the main power supply 29 on the same substrate as the constant-voltage power supply 30. The current detection resistor 60 is connected through a connector and a harness to the differential amplifier 61 of the load current detector 33, an accompanying resistor and the like provided on a substrate different from the substrate of the constant-voltage power supply 30 (main power supply 29) while voltage of the both ends of the current detection resistor 60 is used as an interface signal between the substrates.

This structure achieves minimization of deterioration of output accuracy of the power supply due to extension (stretch) of a constant-voltage feedback loop of the constant-voltage power supply 30. That is, increase in cost of the constant-voltage power supply 30 due to use of remote sensing of the constant-voltage power supply 30 is suppressed. Here, consider making an auxiliary power supply system (combination of the auxiliary power supply 32, the current instruction unit 64, and the load current detector 33) optional. Then, when the auxiliary power supply system is not selected to be used, the auxiliary power supply 32, the current instruction unit 64, the differential amplifier 61 of the load current detector 33, and the accompanying resistor can be easily removed from the main power supply system (main power supply 29) without changing the main power supply system. Therefore, making the main power supply system capable of connecting to the auxiliary power supply system only causes increase in a cost of the main power supply system (main power supply 29) just corresponds to addition of the current detection resistor 60, and almost never causes drastic cost increase.

However, when the main power supply 29 is configured to include the current detection resistor 60 even if an auxiliary power supply system as described above is not equipped, power is consumed by the current detection resistor 60 in a power supply device to which the auxiliary power supply system is not connected.

A value will further decrease when a load is small, such as at the time of standby. However, if addressing this, a jumper wire is connected instead of mounting the current detection resistor 60. This involves just minor change and can prevent complication of structure of the main power supply 29. Further, a cost of the main power supply 29 when the auxiliary power supply system is not mounted can be reduced.

Moreover, the entire load current detector 33 including the differential amplifier 61, the accompanying resistor and the like can be mounted as a part of the constant-voltage power supply 30 of the main power supply 29 on the same substrate as the constant-voltage power supply 30, and can be connected through a connector, a harness and the like to the current instruction unit 64 provided on a different substrate from the constant-voltage power supply 30 (main power supply 29) while a load current signal output from the differential amplifier 61 is used as an interface signal between the substrates.

This structure can provide substantially the same effect although a cost of the differential amplifier 61, the accompanying resistor and the main power supply 29 will increase as compared with the aforementioned structure, and moreover, noise resistance can be increased because of amplification of a received and transmitted signal. That is, stability of a current detection function can be improved.

When a power cut occurs, the power cut is detected by the power cut detection unit 90 and information on this is sent to the input output control unit 20. The power cut state monitoring unit 11 of the input output control unit 20 sends a switching signal to a switching circuit 55, and the switching circuit 55 switches output of the second power supply (constant-current/constant-voltage switching power supply 26) from constant-current control into constant-voltage control output.

As for structure of an output voltage controller 56 for the constant-voltage control, as shown in an insulated error amplifier 83b, a voltage detection signal divided by the voltage dividing resistor may be compared/amplified with reference voltage by a shunt regulator, and given to the PWM controller 42 as a feedback signal for the constant-voltage control while ensuring insulation through a photocoupler.

As the switching circuit 55, any element capable of sending, to the PWM controller 42, output of any one of output by the constant-current control and output by the constant-voltage control of the second power supply (constant-current/constant-voltage switching power supply 26) may be used, and the switching circuit 55 may be structured by, for example, a switching component such as a relay element.

Figure 6:
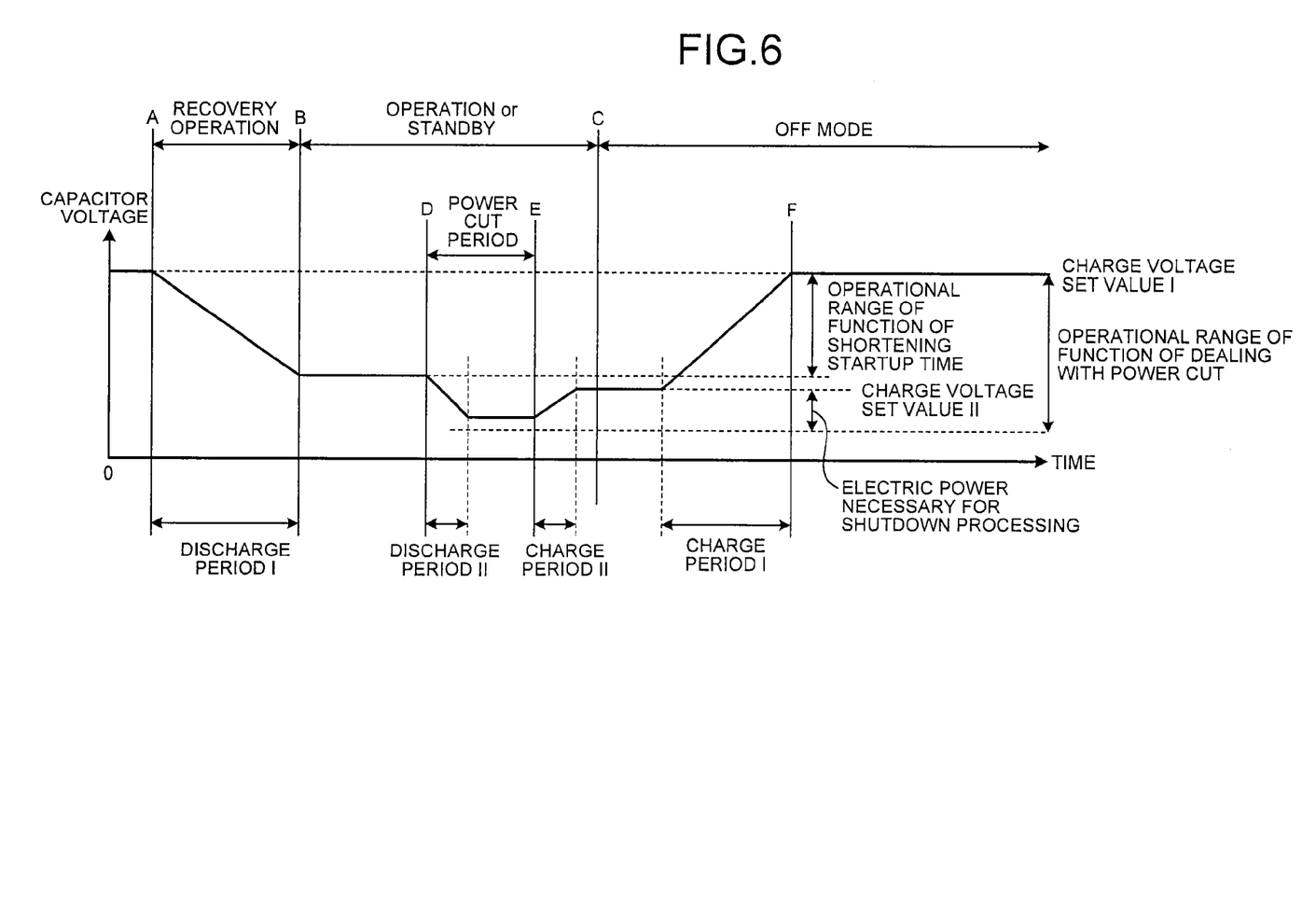
FIG. 6 is a timing chart representing the relation between voltage transition of a second power supply and each state of the device in FIG. 3.
Figure 7:
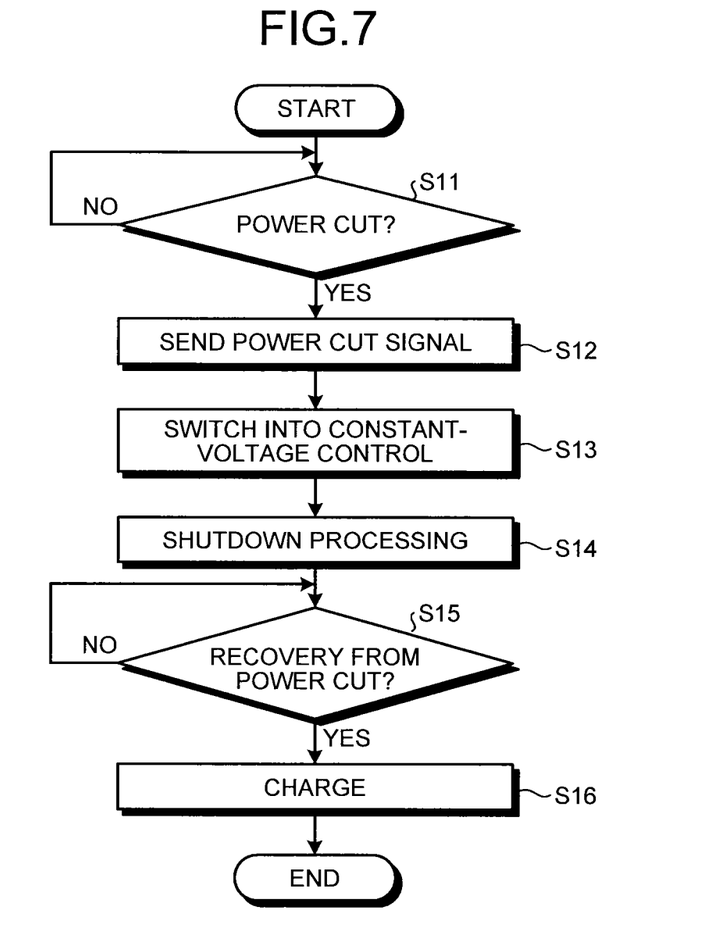
FIG. 7 is a flow chart illustrating the operation of the first embodiment.

Relation Between Voltage Transition of Second Power Supply and Respective States FIG. 6 is a timing chart representing relation between voltage transition of the second power supply in FIG. 3 and respective states of the device. FIG. 6 illustrates power storage transition of the capacitor 37 that depends on a device state, in which a horizontal axis represents time and a vertical axis represents power storage voltage of the capacitor 37 of the device. FIG. 7 is a flow chart of operation according to the first embodiment.

In FIG. 6, "off mode" represents a state in which power supply to a heat generator (such as a halogen heater) of the fixing heating device 36 is stopped until the following operation (a) or (b) is performed next time (a state in which power supply to the heat generator of the fixing heating device 36 is stopped in preparation for next recovery into a state in which fixing is made possible): (a) a user turns on a power supply switch (not the main power supply switch 28) of the image formation device itself; or (b) an external signal such as an image formation signal is input.

"Standby time" represents a state in which the image formation device does not execute image formation operation and the fixing heating device 36 is kept at predetermined temperature lower than temperature at which fixing is possible, or represents a state in which the image formation device does not execute image formation operation and power is not supplied from the main power supply 29 to a heat generator of the fixing heating device 36. "Recovery time" represents a period from the standby time until temperature of a surface of a fixing roller of the fixing heating device 36 is increased up to predetermined temperature by power supply to the heat generator of the fixing heating device 36.

When an operation instruction of an operator is made (timing A), operation for starting (recovering) the device is started. At this time, stored power is used in order to shorten startup time of the fixing heating device 36; therefore, capacitor voltage drops down to a lower limit (timing B) of an operational range of a function of shortening startup time (discharge period I). Moreover, an amount of electric power supplied from the capacitor 37 is large and reaches several hundreds of watts, and in a case where a constant amount of power is supplied to the system in a period where power supply from the auxiliary power supply 32 is performed, terminal voltage of the capacitor 37 decreases as the capacitor 37 discharges; therefore, output current of the capacitor 37 increases along with the passage of time. Since a structure circuit has limitation on conduction current, the circuit is set so as not to be used at less than or equal to predetermined voltage. In other words, capacitance of the capacitor 37 is set so as to secure capacitance of the auxiliary power supply 32 that enables satisfaction of target startup time in the operational range.

Then, after the off mode, charge operation is performed so that the capacitor 37 is fully charged at a timing F at which the auxiliary power is necessary to shorten the startup time (charge period I). Here, there is difference between a timing C of transition to the off mode and a timing F at which power supply from the auxiliary power supply 32 is necessary to shorten the startup time. This is because the fixing heating device 36 can start up just in the target startup time without requiring power supply from the auxiliary power supply 32 for a while after transition to the off mode because of stored heat. The capacitor 37 has a self-discharging effect, and consumes less power when power storage voltage is lower; therefore, if power is stored only when it is necessary, energy-saving effect can be increased.

Next, operation during a power cut is explained. In a flow chart of FIG. 7, the power cut detection unit 90 detects presence or absence of a power cut (Step S11). When the power cut detection unit 90 detects a power cut (YES in Step S11) (timing D in FIG. 6), a signal indicating the power cut is sent to the power cut state monitoring unit 11 (Step S12). Subsequently, the output switching instruction unit 13 of the input output control unit 20 performs control so that the second power supply (constant-current/constant-voltage switching power supply 26) is switched from the constant-current control to the constant-voltage control (Step S13). Power is supplied to the load from the capacitor 37 after this switching from the constant-current control into the constant-voltage control; here, supplementary explanation of shutdown time to safely protect data stored in the system will be made.

Subsequently, the shutdown processing unit 14 of the input output control unit 20 executes shutdown processing including processing of preparing for next startup and protection processing for various data (Step S14). At this time, the shutdown processing unit 14 of the input output control unit 20 operates using power of the capacitor 37; therefore, voltage of the capacitor 37 drops down to a lower limit of an operational range of a function of dealing with a power cut set to be lower than the lower limit of the operation range of the function of shortening startup time (discharge period II).

At this time, because an amount of power consumed in the shutdown processing is small, i.e., several tens of watts and thus a circuit is not burdened even though power of the capacitor 37 is used at a voltage lower than the lower limit of the operational range of the function of shortening startup time, the operational range of the function of dealing with the power cut is set separately from the operational range of the function of shortening startup time.

Then, whether recovery from the power cut is made or not is determined (Step S15), and here, charge operation (charge period II) is performed in preparation for a next power cut after the recovery from the power cut at a timing E (YES in Step S15) by the recovery control unit 15 (Step S16). As described in the charge operation of the charge period I, startup is possible in the target startup time without requiring power supply from the auxiliary power supply 32 for a while after transition to the off mode; therefore, in the charge period II, charging is performed up to a charge voltage set value II lower than the lower limit of the operational range of the function of shortening startup time so that only power necessary for the shutdown processing is stored in the charge period II.

Now, detailed description is made of how to determine the charge voltage set value II (a calculation example is shown). For example, assuming that power necessary for the shutdown processing is 10 W (control voltage 5 V×consumption current 2 A) and a restriction value of conduction current of a discharge circuit of the capacitor 37 is 5 A; then, a lower limit of capacitor voltage that can be used in the shutdown processing is determined as 2 V. Then, assuming that capacitance of the capacitor 37 is 75 F (600 F×8 pieces), remaining energy is determined as 150 J.

Assuming that time necessary for the shutdown processing is 120 seconds, an amount of consumption power in the shutdown processing is 5 V×2 A×120 s=1200 J. The shutdown processing can be normally executed only when voltage of the capacitor 37 is kept at or above voltage when 1350 J, which is obtained by adding the aforementioned energy (150 J) to this 1200 J, is stored, i.e., 6 V (½×C (capacitance of the capacitor)×V (capacitor voltage)$^2$=W (storage power energy)). The charge voltage set value II is set to this voltage.

In the above calculation example, the charge voltage set value II is determined without considering variation in consumption power and processing time of the shutdown processing, detection variation of power storage voltage, voltage drop due to the self-discharging effect of the capacitor 37, and the like; however, when these are considered, the function of dealing with the power cut can be made more stable.

Second Embodiment

Structure of Power Supply Device of Second Embodiment

Figure 8:
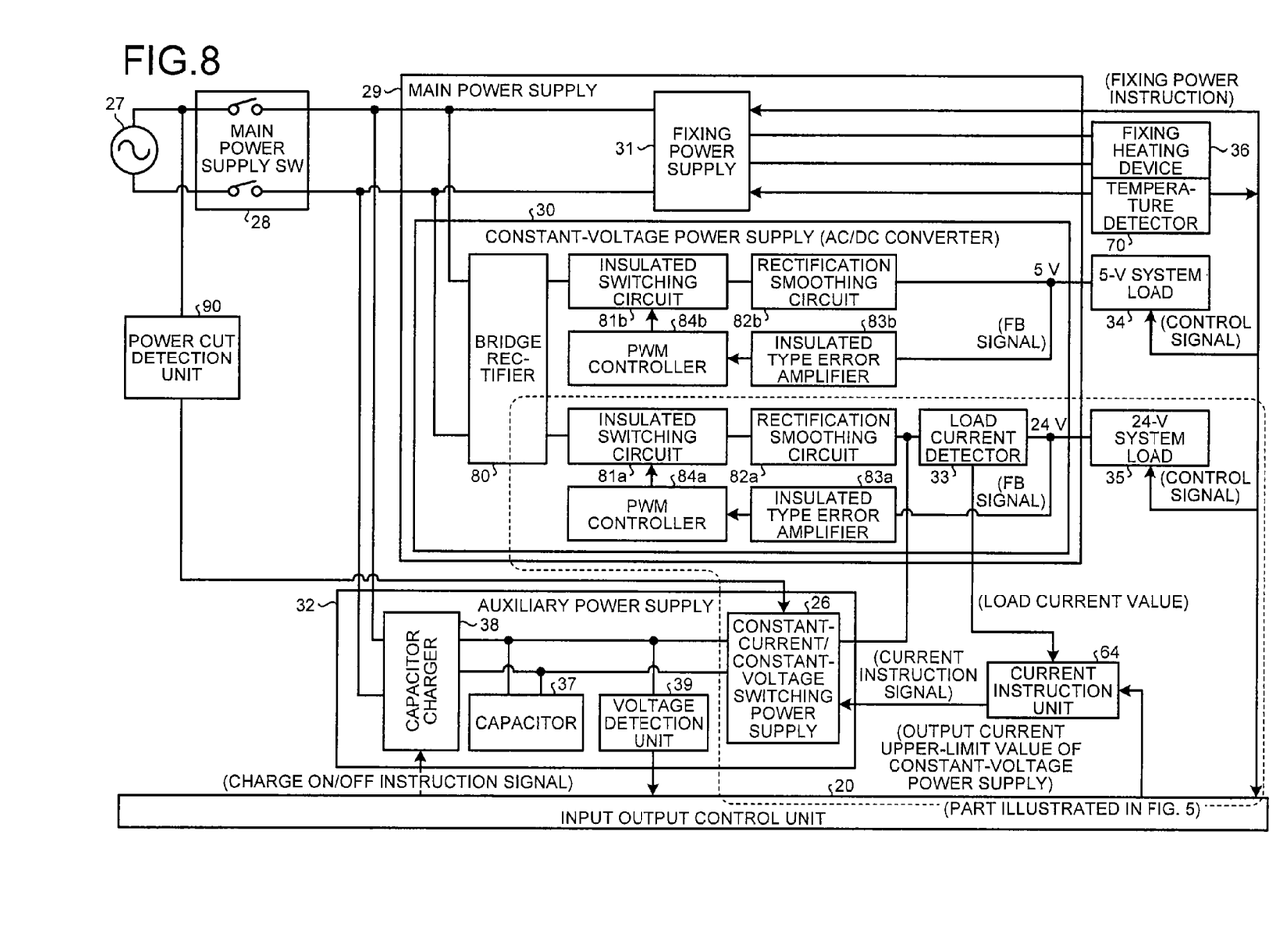
FIG. 8 is a block diagram illustrating a structure of a power supply device according to a second embodiment.

FIG. 8 is a block diagram illustrating a structure of a power supply device according to the second embodiment of the present invention. In this drawing, parts that are the same as or similar to parts in FIG. 3 are denoted with the same reference symbols as those in FIG. 3.

This embodiment provides a structure in which switching from the constant-current output to the constant-voltage output is controlled using hardware, and detection information representing presence or absence of a power cut is sent from the power cut detection unit 90 directly to the constant-current/constant-voltage switching power supply 26 without transmitting it to the input output control unit 20. Use of hardware structure can eliminate software processing, which is used in the structure illustrated in FIG. 3, so that power supply can be switched more quickly in case of a power cut.

Figure 9:
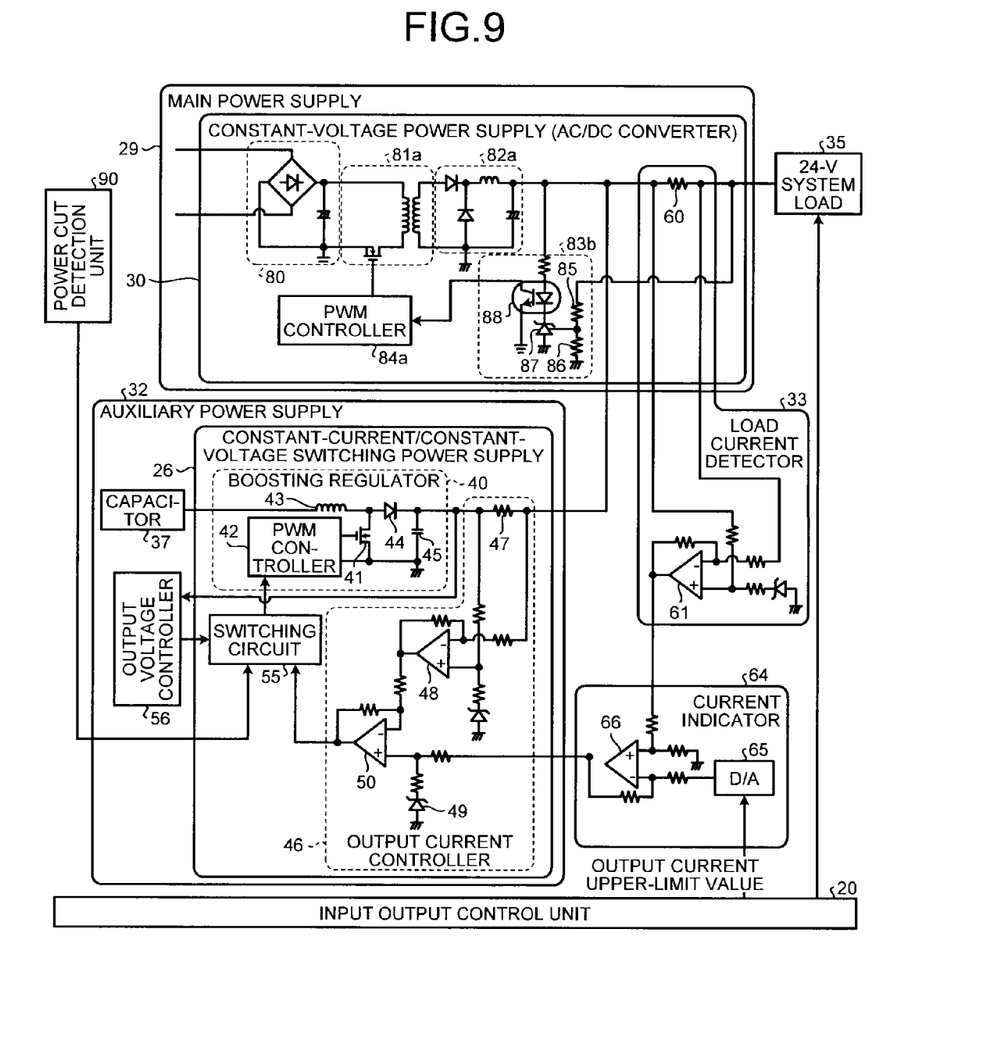
FIG. 9 is an explanatory view illustrating detailed structures of a constant-voltage power supply, a constant-current/constant-voltage switching power supply, a load current detector, and a current instruction unit in FIG. 8.

Details of Constant-Voltage Power Supply, Constant-Current/Constant-Voltage Switching Power Supply, Load Current Detector, and Current Instruction Unit FIG. 9 is an explanatory view illustrating detailed structure of the constant-voltage power supply 30, the constant-current/constant-voltage switching power supply 26, the load current detector 33, and the current instruction unit 64 in FIG. 8.

Output from the power cut detection unit 90 is sent to the switching circuit 55 directly. Therefore, power supply can be switched without software processing time in the input output control unit 20. Here, switching structure using hardware is illustrated, and other operation details are omitted because they are similar to those of the structure in FIG. 5.

By the way, a program executed in this embodiment is incorporated in advance in the ROM 22; however, the present invention is not limited to this. The program executed in this embodiment may be recorded in a recording medium, from which the program can be read using a computer, such as a CD-ROM, a flexible disk (FD), a CD-R, or a DVD (digital versatile disk) in an installable or executable file form, and the medium may be provided as a computer program product.

Alternatively, the program executed in this embodiment may be stored on a computer connected to a network such as the Internet and provided by being downloaded via the network. Further alternatively, the program executed in this embodiment may be provided or distributed via a network such as the Internet.

The program executed in this embodiment has a module structure including the aforementioned power cut state monitoring unit 11, current upper-limit value instruction unit 12, output switching instruction unit 13, shutdown processing unit 14, and recovery control unit 15. As for actual hardware, the CPU 21 (processor) reads out the program out of the recording medium and executes the program, thereby loading respective units on a main memory device such as the RAM 23; thus, the power cut state monitoring unit 11, the current upper-limit value instruction unit 12, the output switching instruction unit 13, the shutdown processing unit 14, and the recovery control unit 15 are generated on the main memory device.

Although explanation is made by exemplifying an image formation device in the above embodiments, another device may be applicable. For example, the present invention can be applied to an information processing device such as a projector or a tablet terminal.

The embodiments provide an advantageous effect of making it possible to supply power to a load even if power supply from an external power supply is stopped, in a power supply device including a main power supply that feeds power to the load with constant-voltage output using the external power supply as an electric power supply source, and an auxiliary power supply that feeds power to the load with constant-current output using an internal power storage unit as an electric power supply source, wherein a part of load current by which part the load current exceeds an upper-limit instruction value of an output current value of the main power supply is fed from the auxiliary power supply.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power supply device comprising:
 a main power supply configured to feed power to a load with a constant-voltage output using an external power supply as an electric power supply source;
 an auxiliary power supply capable of switching between a constant-current output and a constant-voltage output, and configured to feed power to the load using an internal power storage unit as an electric power supply source;
 a load current detector configured to detect a value of current flowing through the load;
 a current upper-limit value instruction unit configured to output an upper-limit value of output current of the main power supply;
 a constant-current/constant-voltage switching power supply configured to feed, based on the value of current flowing through the load detected by the load current detector and the upper-limit value of output current of the main power supply given from the current upper-limit instruction unit, a part of the current flowing through the load by which part the current flowing through the load exceeds the upper-limit value, with the constant-current output from the auxiliary power supply;
 a power cut detection unit configured to detect a stop of a supply of electric power from the external power supply;

a power cut monitoring unit configured to monitor an occurrence of a power cut in accordance with a power cut detection signal resulting from detection by the power cut detection unit; and an output switching unit switching the constant-current/constant-voltage switching power supply from the constant-current output to the constant-voltage output when the power cut monitoring unit determines the stop of the supply of electric power from the external power supply.

2. The power supply device according to claim 1, further comprising a shutdown processing unit configured to execute a shutdown processing including a processing of preparing for next startup and a protection processing for various data.

3. The power supply device according to claim 2, further comprising a recovery control unit configured to cause the internal power storage unit to perform a power storage operation in preparation for a next power cut after recovery from a power cut, wherein the recovery control unit stores, in the internal power storage unit, just electric power necessary for the shutdown processing unit to perform the shutdown processing.

4. The power supply device according to claim 1, wherein the power storage unit is an electric double-layer capacitor.

5. A power supply device comprising:
a main power supply configured to feed power to a load with a constant-voltage output using an external power supply as an electric power supply source;
an auxiliary power supply capable of switching between a constant-current output and a constant-voltage output, and configured to feed power to the load using an internal power storage unit as an electric power supply source;
a load current detector configured to detect a value of current flowing through the load;
a current upper-limit value instruction unit configured to output an upper-limit value of output current of the main power supply;
a constant-current/constant-voltage switching power supply configured to feed, based on the value of current flowing through the load detected by the load current detector and the upper-limit value of output current of the main power supply given from the current upper-limit instruction unit, a part of the current flowing through the load by which part the current flowing through the load exceeds the upper-limit value, with the constant-current output from the auxiliary power supply;

a power cut detection unit configured to detect a stop of a supply of electric power from the external power supply; and
a switching circuit configured to switch an output of the constant-current/constant-voltage switching power supply to the constant-voltage output in accordance with a power cut detection signal resulting from the detection by the power cut detection unit.

6. The power supply device according to claim 5, wherein the power storage unit is an electric double-layer capacitor.

7. A control method for a power supply device, wherein the power supply device comprising:
a main power supply configured to feed power to a load with a constant-voltage output using an external power supply as an electric power supply source;
an auxiliary power supply capable of switching between a constant-current output and a constant-voltage output, and configured to feed power to the load using an internal power storage unit as an electric power supply source;
a load current detector configured to detect a value of current flowing through the load;
a current upper-limit value instruction unit configured to output an upper-limit value of the output current of the main power supply;
a constant-current/constant-voltage switching power supply configured to feed, based on the value of current flowing through the load detected by the load current detector and the upper-limit value of output current of the main power supply given from the current upper-limit instruction unit, a part of the current flowing through the load by which part the current flowing through the load exceeds the upper-limit value, with the constant-current output from the auxiliary power supply; and
a power cut detection unit configured to detect a stop of a supply of electric power from the external power supply, and
the method comprising:
monitoring an occurrence of a power cut in accordance with a power cut detection signal resulting from the detection by the power cut detection unit; and
switching the constant-current/constant-voltage switching power supply from the constant-current output into the constant-voltage output when the power cut detection unit determines the stop of the supply of electric power from the external power supply.

* * * * *